US007912272B2

(12) United States Patent
Joshi et al.

(10) Patent No.: US 7,912,272 B2
(45) Date of Patent: Mar. 22, 2011

(54) FAKE DOCUMENT INCLUDING FAKE CURRENCY DETECTOR USING INTEGRATED TRANSMISSION AND REFLECTIVE SPECTRAL RESPONSE

(75) Inventors: Murli Manohar Joshi, New Delhi (IN); Ram Prakash Bajpai, Chandigarh (IN); Gautam Mitra, Chandigarh (IN); Harish Kumar Sardana, Chandigarh (IN); Hari Narayan Bhargaw, Chandigarh (IN); Saroj Batra, Chandigarh (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 12/648,176

(22) Filed: Dec. 28, 2009

(65) Prior Publication Data

US 2010/0104170 A1 Apr. 29, 2010

Related U.S. Application Data

(60) Division of application No. 11/263,534, filed on Nov. 1, 2005, now Pat. No. 7,650,027, which is a continuation of application No. 11/073,585, filed on Mar. 8, 2005, now abandoned.

(60) Provisional application No. 60/550,737, filed on Mar. 8, 2004.

(51) Int. Cl.

| | |
|---|---|
| ***G06K 9/00*** | (2006.01) |
| ***G06K 7/00*** | (2006.01) |
| ***G06K 9/74*** | (2006.01) |
| ***B07C 5/00*** | (2006.01) |

(52) U.S. Cl. ........ 382/137; 382/312; 382/135; 382/138; 209/534; 194/302

(58) Field of Classification Search .......... 382/135–140, 382/305, 312, 318, 309, 274, 282, 287; 194/302; 209/534; 356/71
See application file for complete search history.

(56) References Cited

U.S. PATENT DOCUMENTS

| | | | | | |
|---|---|---|---|---|---|
| 4,513,439 | A | | 4/1985 | Gorgone et al. | |
| 4,542,829 | A | * | 9/1985 | Emery et al. | 209/534 |
| 4,710,963 | A | | 12/1987 | Chapman et al. | |
| 4,875,589 | A | * | 10/1989 | Lacey et al. | 209/534 |
| 5,438,403 | A | | 8/1995 | Hoshino et al. | |
| 5,468,971 | A | | 11/1995 | Ebstein et al. | |
| 5,640,463 | A | | 6/1997 | Csulits | |
| 5,815,592 | A | * | 9/1998 | Mennie et al. | 382/135 |
| 5,825,911 | A | | 10/1998 | Nishigai et al. | |
| 5,881,196 | A | | 3/1999 | Phillips | |

(Continued)

OTHER PUBLICATIONS

Wheeler et al. "Multiple Algorithms for Fraud Detection" Knowledge Based Systems 13 (2000). pp. 93-99.

*Primary Examiner* — Bhavesh M Mehta
*Assistant Examiner* — Mia M Thomas
(74) *Attorney, Agent, or Firm* — Sughrue Mion, PLLC

(57) ABSTRACT

A currency genuineness detection system using plurality of opto-electronic sensors with both transmission and reflective (including fluorescence) properties of security documents is developed. Both detection sensing strategies utilize integrated response of the wide optical band sensed under UV visible along with optional near infra red light illumination. A security document is examined under static condition. A window signal signature is thus possible from photodetectors responses for various kinds of documents of different denominations, kinds and country of origin. A programmable technique for checking the genuineness of a security document is possible by feeding a unique code of the currency under examination.

33 Claims, 5 Drawing Sheets

System software flow chart m: no. of photodetectors (at least 6) ; n: no. of ratio normalised feature sets Flow chart for document authentication

U.S. PATENT DOCUMENTS

| | | | | |
|---|---|---|---|---|
| 5,955,741 | A | 9/1999 | Kayani | |
| 6,040,584 | A | 3/2000 | Liu et al. | |
| 6,073,744 | A | 6/2000 | Raterman et al. | |
| 6,104,036 | A | 8/2000 | Mazowiesky | |
| 6,438,262 | B1 | 8/2002 | Bernardini et al. | |
| 6,483,576 | B1 | 11/2002 | Gardner | |
| 6,628,439 | B2 | 9/2003 | Shiozawa et al. | |
| 6,639,200 | B2 | 10/2003 | Chen | |
| 6,654,486 | B2 * | 11/2003 | Jones et al. | 382/135 |
| 6,766,045 | B2 | 7/2004 | Slepyan et al. | |
| 6,798,900 | B1 | 9/2004 | Sugata | |
| 6,830,128 | B2 | 12/2004 | Burgeson | |
| 6,848,561 | B2 | 2/2005 | Bao | |
| 6,937,752 | B2 | 8/2005 | Chiba et al. | |
| 7,184,133 | B2 | 2/2007 | Coombs et al. | |
| 7,255,266 | B2 * | 8/2007 | VanKirk et al. | 235/379 |
| 7,266,231 | B2 | 9/2007 | Christophersen et al. | |
| 7,271,398 | B2 | 9/2007 | Androsyuk et al. | |
| 7,550,736 | B2 * | 6/2009 | Schuett et al. | 250/372 |
| 7,574,033 | B2 | 8/2009 | Ishida et al. | |
| 7,620,231 | B2 * | 11/2009 | Jones et al. | 382/137 |
| 7,650,027 | B2 * | 1/2010 | Joshi et al. | 382/135 |
| 7,657,472 | B2 * | 2/2010 | Humpisch et al. | 705/35 |
| 7,684,607 | B2 * | 3/2010 | Joshi et al. | 382/137 |
| 7,715,610 | B2 * | 5/2010 | Anouar et al. | 382/135 |
| 7,817,842 | B2 * | 10/2010 | Mennie | 382/137 |
| 2002/0109830 | A1 | 8/2002 | Liu | |
| 2002/0179501 | A1 * | 12/2002 | Gawne | 209/534 |
| 2003/0118228 | A1 * | 6/2003 | Mennie et al. | 382/135 |
| 2006/0078186 | A1 * | 4/2006 | Freeman et al. | 382/135 |
| 2006/0115139 | A1 | 6/2006 | Joshi et al. | |
| 2006/0177117 | A1 * | 8/2006 | Morisaki et al. | 382/135 |
| 2006/0202023 | A1 * | 9/2006 | VanKirk et al. | 235/379 |
| 2008/0044077 | A1 * | 2/2008 | Mennie et al. | 382/135 |
| 2009/0087077 | A1 | 4/2009 | Nireki | |
| 2009/0279771 | A1 * | 11/2009 | Stapfer | 382/137 |
| 2010/0092065 | A1 * | 4/2010 | Jones et al. | 382/135 |

* cited by examiner

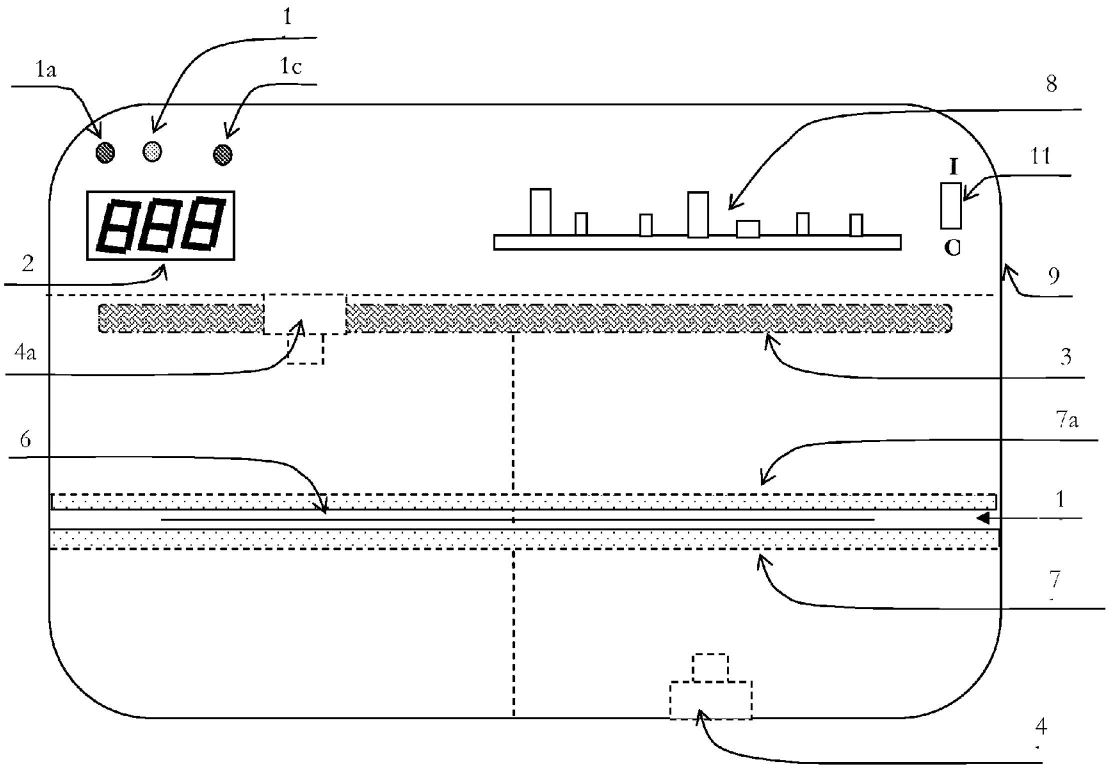
Figure 1: Block Diagram of the instrument showing both transmission and reflection properties of a security document

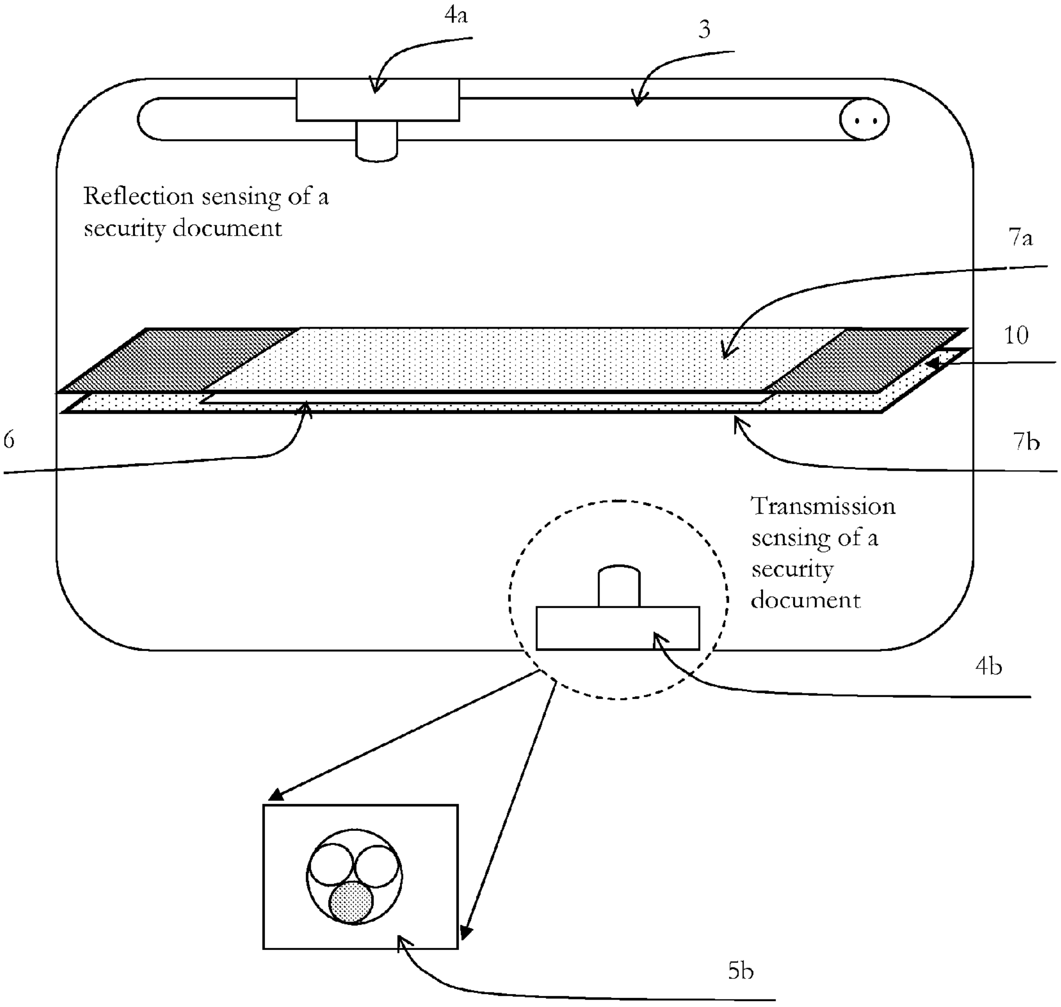
Figure 2: Design showing both transmission and reflection properties sensing for authenticity testing of a security document

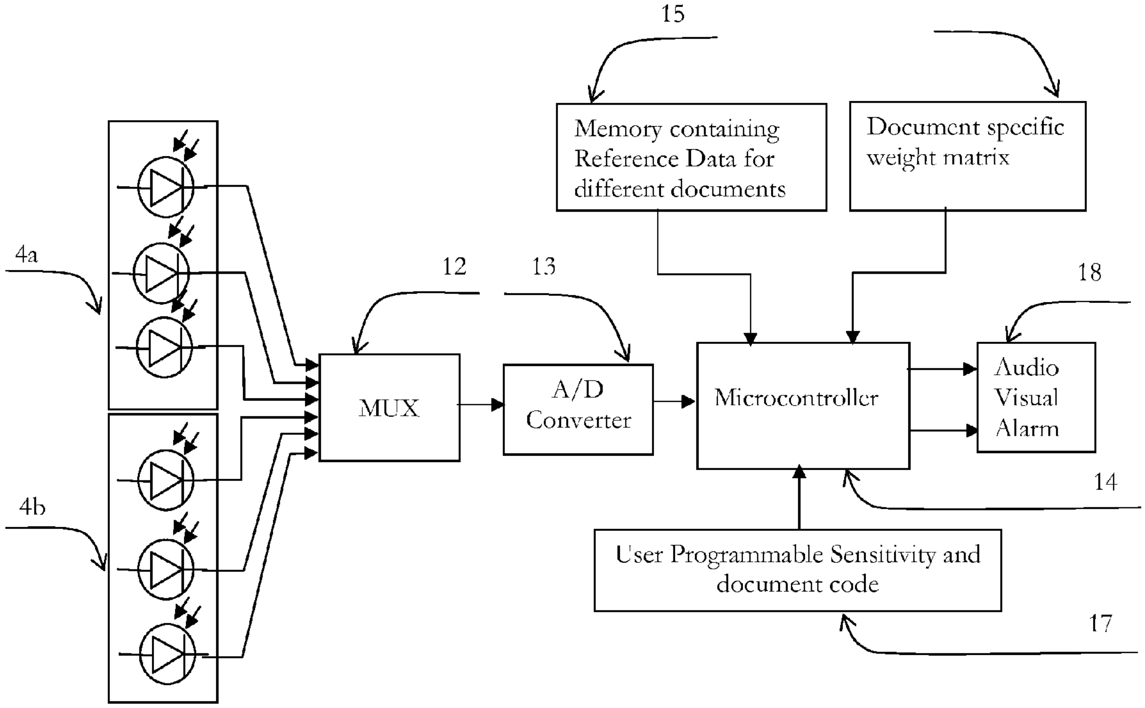
Figure 3: Block diagram of the Electronic sub-system

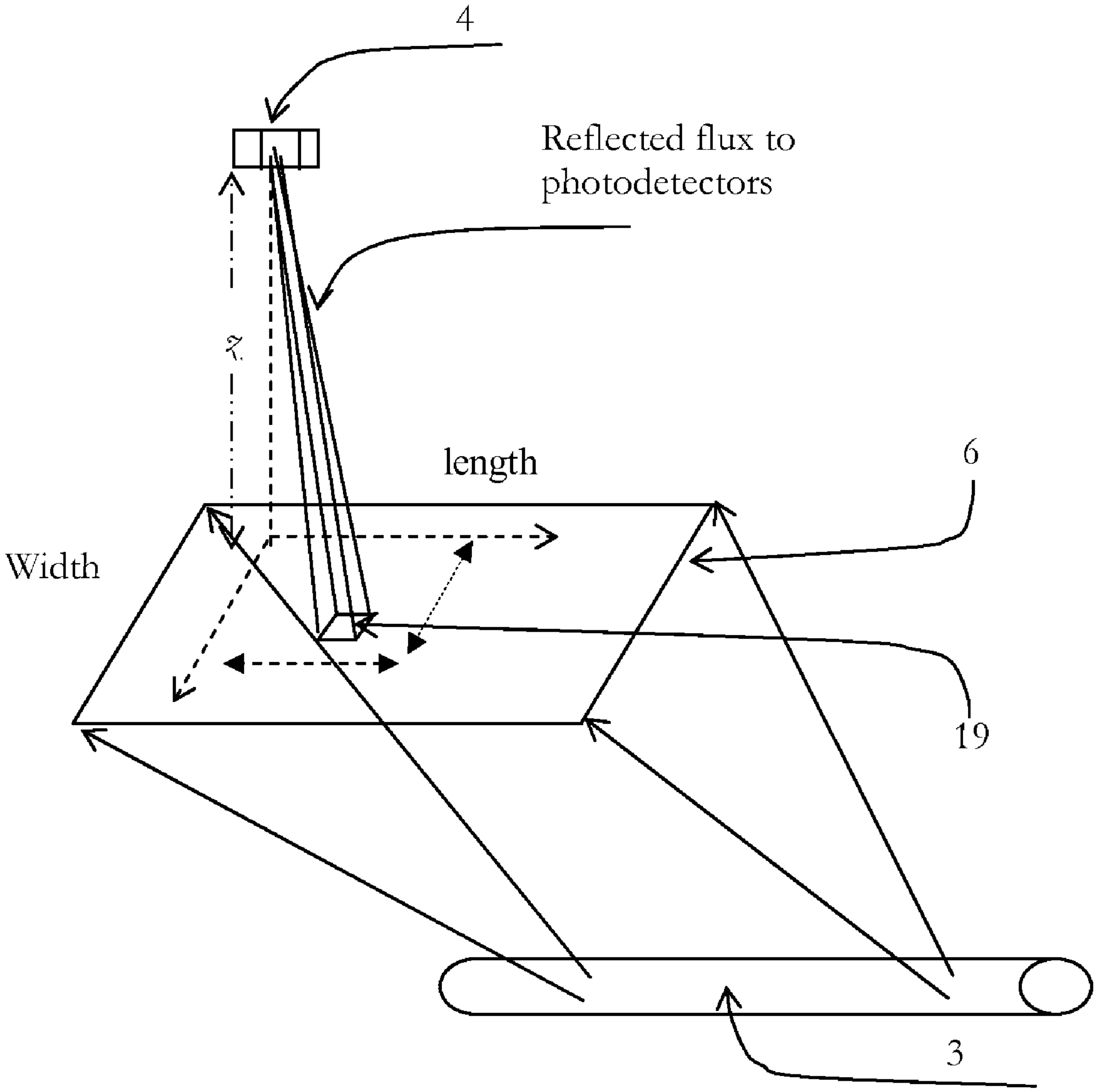
Figure 4: Ray Diagram (Schematic)

System software flow chart
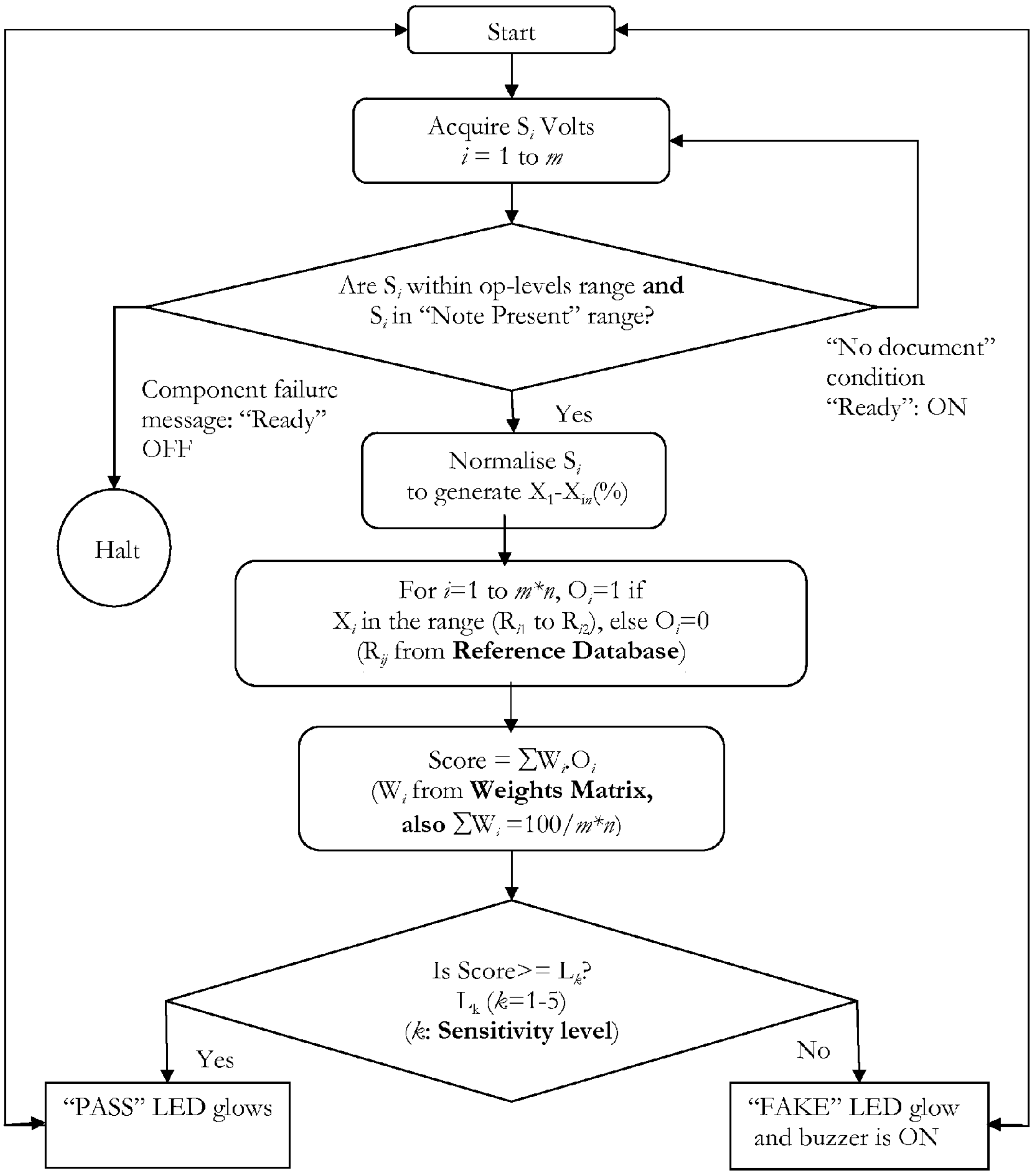
$m$: no. of photodetectors (at least 6) ; $n$: no. of ratio normalised feature sets
Figure 5: Flow chart for document authentication

FAKE DOCUMENT INCLUDING FAKE CURRENCY DETECTOR USING INTEGRATED TRANSMISSION AND REFLECTIVE SPECTRAL RESPONSE

CROSS-REFERENCE TO RELATED APPLICATIONS

This is a Divisional of application Ser. No. 11/263,534 filed Nov. 1, 2005 now U.S. Pat. No. 7,650,027, which is a Continuation Application of U.S. application Ser. No. 11/073,585 filed Mar. 8, 2005 now abandoned, which claims benefit of Provisional Application No. 60/550,737 filed Mar. 8, 2004. The entire disclosure(s) of the prior application(s) is hereby incorporated by reference.

FIELD OF THE INVENTION

This invention relates to the development of an improved system for automatic detection of authenticity of currency notes by measuring reflected and transmitted components of incident energy. The system involves the use of UV-visible along with optional near infra red light source, Photodetectors and associated sensing circuitry. The present invention relates to the use of photoelectric signal generated by photodetectors from the reflected and transmitted energy received from a currency note to verify its authenticity under UV-visible along with optional near infra red illumination. The process involves measurement of energy reflected and transmitted as photoelectric signals from a currency note in at least three optical wavebands by suitably located photodetectors and the electronic signal processing to distinguish between a genuine currency from a fake one for ultimate LED indicator display and audio-visual alarms, hence the detection of fake currency note.

BACKGROUND AND PRIOR ART TO THE INVENTION

Presently available currency detectors can be classified into two categories, namely viewer type and automated type. All the viewer type instruments rely on subjective visual assessment of authenticity. Few of the viewers display a magnified view of micro-features under visible light. In some the viewers, a currency note is illuminated by UV light to display fluorescent security features like fibres, UV fluorescent printed pattern. Most automatic type detection systems are currency counters also. The verification in some automated type systems is based on UV measurement of fluoresced/reflected UV radiation from a narrow strip of the currency note; the data are collected by moving the note across a detector and measuring the energy from a small area at a time i.e. by scanning and sampling technique. The measured energy is converted into an electrical signal. Data acquired from a genuine currency notes is set as reference. Any deviation of the measured signal from this reference value is indicative of counterfeit. The few of the automatic verifiers measure reflected/fluoresced UV light from UV fluorescent security feature(s). Some currency verifiers are based on scanning a part of the printed pattern and looks for inconsistent locations of the small dots of the printing material. With the advent of technology, art of counterfeiting is also progressing rapidly. Earlier, fake currencies were produced either by colour scanning followed by high-resolution printing (alternatively colour photocopying) or by crude printing on non-security papers. The today's bank notes incorporate several security features like intaglio printing, optically variable ink (OVI) features, and UV fluorescent features including fluorescent fibres. Clever counterfeiters are now attempting to duplicate these features including fluorescent properties of the paper. A very thin line of demarcation now exits between a counterfeit currency note and an authentic one. At least two different modes of verification are imperative to assess the authenticity. The visual and UV fluorescent security features incorporated in a currency note vary from country to country and also denomination dependent. The judgement of authenticity of a currency note relying either on visual assessment or on rapid opto-electronic detection 'on-the-fly' technique based on scanning the light reflected or transmitted from a narrow zone may likely to yield misleading conclusions. A suitable apparatus providing the combination of integrated reflected as well as transmitted energy, received from a large area of a currency note, measurement facilities in at least three different wavebands both for the reflected and transmitted components, in static condition of the currency note, which can be adopted for the currencies from various countries of different denominations or in various physical conditions of the note to be inspected is not available.

ANALYSIS OF PRIOR ART

The following basic principles are used to verify the genuineness of a currency note:

- i Visually observing the UV fluorescent features, printed or embedded, of the currency note
- ii Reading the magnetically recorded code by a magnetic sensor
- iii Assessing the quality of print by studying the mis-registration
- iv Assessing the currency paper quality by measuring the quantum of UV light reflected/transmitted
- v Assessing the currency paper quality by measuring the quantum of UV light fluoresced
- vi Assessing a electronically recorded image
- vii Multifunctional apparatus for discrimination and authentication All the above cited prior arts rely on one of these principles—variations are in the techniques of data collection and the area of the currency note from where data are collected. The drawbacks of the prior arts are discussed below.

The paper used in currency notes has cotton based fibres as the base material that shows very little UV fluorescent property. Other types of paper convert incident UV radiation into visible light. The amount of UV light reflected and fluoresced are complimentary as higher is the quotient of fluorescence, less is the amount reflected and vice versa. So, the measurement one or the other provides similar information. Transmittance also depends on fluorescence since, if large fluorescence will reduce the transmitted components. Accordingly, principles mentioned under (iii) and (iv) above are some similar in nature, data interpretations. All the existing prior arts employing the principals (ii) and (iii) differ in the measurand, and technique of scanning and the zone of data acquisition. These have common limitations. The drawbacks of the all the prior arts are discussed below, apparatuses are classified in accordance with their principle of operation.

Visually Observing the Printed or Embedded UV Fluorescent Features

Prior arts listed in the U.S. Pat. No. 5,942,759 and US2001054644 belongs to this category.

These are basically viewers where in the operator exposes the currency note to UV radiation and looks for the presence or absence of printed or embedded UV fluorescent features like serial no., floral or other patterns, thread and fibres etc. These instruments rely on two dimensional image capabilities of human eye and data processing power of the brain. Drawbacks are:

- Decision is subjective and needs a priori knowledge about an authentic currency note identical in all respect, except physical conditions, to the one under verification.
- It is practically impossible to stock standard samples either as images in the brain or physically corresponding currency notes of different denominations from various countries.

Modern counterfeits incorporate many UV fluorescent printed features to fool an operator relying on visual inspection only. Viewer types are not relevant to the present invention.

Magnetic Sensor Based Equipment

Prior arts listed in the U.S. Pat. No. 4,464,787 and U.S. Pat. No. 5,874,742 fall under this category. The drawbacks are:

- Magnetic code readers are basically currency discriminators—magnetic code can be duplicated easily and hence not a reliable method of authentication
- Currency notes from many countries do not contain magnetic codes. Genuineness of currency notes from these countries can not be assessed.
- Magnetic code of a currency note may be wiped out due to accidental exposure to strong magnetic field, magnetic sensor based instruments would fail to authenticate such a note.
- Some machines scan the currency note to determine its dimensions for hence authentication. Dimensional data is unreliable.

These apparatuses are also not closest prior art.

Instruments Based on Assessing the Quality of Print by Studying the Mis-Registration Prior arts listed in the U.S. Pat. No. 4,482,971 belong to this category. Currency notes counterfeited by high resolution scanning and printing or colour photocopying process. The instruments scan and look for presence of small dots of printing ink inconsistent with the printed pattern. The main drawback is:

- Modern counterfeited currency notes are printed in sophisticated notes duplicating most of the processes employed to print authentic currency notes without any discernable mis-registration error. These types of notes cannot be authenticated by studying the mis-registration error.

These apparatuses are also not closest prior art.

Instruments Based on of the Quantum of UV Light Fluoresced/Reflected/Transmitted Energy Measurement Prior arts listed in the U.S. Pat. No. 4,482,971 and FR2710998 belongs to this category. All of these scan a narrow zone, sampling a small area at a time, while the currency note moves below or over the photodetector. Measurand is either the reflected or transmitted or fluoresced component of incident UV light (there is only one patent, FR2710998, which measures transmitted energy and the rest measure the reflected energy). UV light is either blocked (fluorescent measurement) or rest of the optical spectrum is blocked only UV light is allowed to pass (UV reflectance/transmittance measurement) by a filter. The drawbacks are:

- Measured fluoresced/reflected/transmitted energy data corresponding to UV region of the spectrum alone cannot reliably characterize the paper quality. Cleverly counterfeited currency notes can mimic UV fluoresce/reflection/transmission coefficient sufficiently close to that of a currency paper.
- The source is kept very close to the moving currency note, so the data are collected from a very small area. The measured energy from each small sampled area is either compared to a reference data (collected from similar type authentic currency note) or summed up to compare with similar data collected from a reference sample. Soiling and or mutilations of the currency under authentication would cause substantial amount of data distortion to reliably assess authentication.
- It is known that an accidentally washed genuine note in certain detergent develops UV fluorescent quality. Such a note would be indicated as a counterfeit.
- This principle needs motion of the currency note, and performs only first order verification during stacking/counting of unsoiled notes of similar type. It is not a compact and cheap system.
- Some apparatuses measure the fluorescent energy emanated from certain printed features, e.g. thread. These need accurate placement of the said feature(s) under the photodetector. Since currency notes of different denominations from different countries contain UV sensitive features at different locations, instruments based on measuring UV fluorescence (by any printed pattern) can be usefully employed for US Dollars only, as all US Dollars have same size and are reasonably similar.

There is only one U.S. Pat. No. 4,618,257 which uses multiple sources emitting different waveband to illuminate a very small zone of the currency note under verification and a single detector collects the energy for each waveband in sequential manner. Since the data corresponds to a small zone, local physical condition, like soiling, mutilation etc. would severely affect the proper authentication process.

Assessing a Electronically Recorded Image

The patent US20030169415 uses a CCD camera to record the image and by tri-chromatic colour analysis technique judges the authenticity. The drawbacks are:

- Soiling, mutilation, physical damage etc. would lead to erroneous results
- Expensive and complex
- Basically designed for passport and similar kinds of documents.

Multifunctional Apparatus for Discrimination and Authentication

US20030081824A1, claims for an improved fake currency detector using different kinds of sensor output. A brief description of is principle of operation and drawbacks are given below:

A multifunctional apparatus is using multiple magnetic and optical sensors. The magnetic sensors scan and generate a magnetic code. Optical sensors scan the currency note in terms reflected energy in two wave bands. Colour matching scheme is also has been claimed to be employed. The two types filters used are used, namely UV pass and UV blocking UV blocking visible pass filter is made a combination of two filters namely a blue filter passing 320 nm to 620 nm with a peak at 450 nm and a yellow filter passing 415 to 2800 nm. So, the visible light sensor sees 415 nm to 620 nm i.e. it senses blue to a small part of red colour.

The drawbacks are:

- Authentication is largely dependent on magnetic and optical scanning Currency notes of many countries do not have any magnetic code.
- In many countries, old notes have threads which do not contain any special optical feature. Such notes would be identified as fake, even if genuine.
- The optical authentication is based on thread parameters. Currency notes of many countries, including India, have different series of same denomination with a wide variation in thread locations. The tolerance limit of 0.05 inch permissible in the patent application would reject authentic currency notes.

A genuine note accidentally discoloured due to bleaching etc. would be indicated as fake.

The principle used can not properly authenticate genuine currency notes having no fluorescence feature (text or thread), such as Asoka pillar Indian currency series of Rs. 50 and Rs. 100 denomination notes, still in wide circulation in India.

The optical authentication is based on printed image pattern and thread data.

Clever counterfeiter can duplicate printed patterns.

The apparatus can not detect NIR sensitive features likely to incorporate in the currency notes of various countries.

The apparatus is complex, expensive and not portable.

Another prior art U.S. Pat. No. 4,618,257 incorporates two LEDs positioned at such angles that they illuminate a common target area and a broad band photo detector to measure the light reflected from the target area. As the currency note is transported under the LEDs, each of the LEDs is switched on sequentially with a pre-determined 'on-time' and 'delay time'. The preferred LED pair is comprised of one narrow band red LED and the other narrow band green LED having peak emission wavelengths of 630 nm and 560 nm respectively. The patent suggests the alternative use of yellow or infrared LED. The measured signals in terms of voltages are compared with the corresponding reference values stored in a memory. The drawbacks of this apparatus are:

It does not collect any data corresponding to the reflectance or fluorescence of UV or blue colour. Reflectance information is confined to only about half of the optical spectral range of 350 to 750 nm. Our experiment has shown, as explained later in Example 1, that UV-blue reflectance property of a currency note is a strong indicator of its genuineness due to the very basic nature of the currency paper.

Due to various reasons including local conditions of a currency note, reflected data from a small area may not be the true representative of the bulk properties.

The apparatus collects data from a specified small target area making it highly position sensitive particularly in case of currency notes of varied sizes.

All known automated currency verifiers require transport mechanism, and cannot operate in stationary condition of the document under. These verifiers pick up one document from a stack of multiple numbers of similar documents, transport it from one place to other and verify authenticity on the fly by scanning it. Such systems are suitable basically for currency note, but can not properly handle documents like bank draft, security bond and other bank instruments where each document is likely very different from the other in shape, size and other similar parameters. There is no patent sealed or filed till date wherein one off a kind documents like, bank drafts, security bonds and other bank instruments and security documents which require manual feeding, can be authenticated by automatic detection mode.

There is no patent sealed or filed till date, which embodies automatic opto-electronic detection techniques using at least three optical wavebands to generate transmittance and reflectance/fluorescence data by measuring both transmitted and reflected energy.

There is no patent sealed or filed till date, which embodies automatic opto-electronic detection technique using more than one optical wavebands to obtain transmittance and reflectance/fluorescence data by spatially integrating energy received from a large area of the document under verification.

There is no known prior art claiming to authenticate polymer based currency notes.

The present invention circumvents the drawbacks of existing prior arts by providing two independent methods of verification and more than one optical band to detect authenticity in automatic mode in a stationary condition of the of the document under authentication by performing large area spatial and temporal integrations simultaneously. However, the techniques and the system can also be adopted in a currency note counting machine by collecting dynamic data at various scanning points. The present invention provides an apparatus that can be used to authenticate paper and polymer based currency note, bank drafts, security bonds and other bank instruments and security documents without any need to modify system hardware.

OBJECTS OF THE INVENTION

The main object of the present invention is to provide an improved system for detecting the authenticity of paper and polymer based currency notes, bank drafts, security bonds and other bank instruments and security documents.

Another object of the present invention is to provide a system capable of automatic detection of authenticity of documents like, bank drafts, security bonds and other bank instruments and security documents which can not be stacked in number and transported one at a time, but needs to be verified under stationary condition but the present invention can be effectively employed to verify currency notes also.

Another object of the present invention is to provide a system incorporating at least three different optical broad band filters to pass three or more optical wavebands both for transmittance and reflectance measurements, the filters used in reflection/fluorescence measurement may or may not be same as those used for transmission measurement.

Another object of the present invention is to provide a system capable of automatic detection of authenticity by performing spatial integration reflected/fluoresced energy from a large surface area of the document under verification in three or more optical wave bands covering UV-visible spectrum—near infra red part of spectrum.

Yet another object of the present invention is to provide a system capable of automatic detection of authenticity by performing spatial integration transmitted energy from a large surface area of the document under verification.

One more object of the present invention is to provide a system capable storing reference information by storing the measured reflection and fluorescent/reflected data in the system memory.

Still one more objective of the present invention is to provide a system capable of suitably normalizing the acquired measured values corresponding to authentic documents and store the values in system memory.

Still one more object of the present invention is to provide a system wherein the reference information for each document type is assigned a unique specific code.

Yet one more object of the present invention is to provide a system wherein updating of stored data base of reference information tagged by suitable document specific codes can be updated and enhanced.

Yet one more object of the present invention is to provide a system capable of storing a currency specific weight matrix in the firmware so as to obtain a minimum false rate.

One more object of the present invention is to provide a system capable of automatic detection of authenticity by deriving a set of ratios from the measured reflection/fluorescence and transmitted data corresponding to the document under verification to form a set of reference for comparison with the corresponding stored values in system memory.

One more object of the present invention is to provide a system capable of automatic detection of authenticity by multiplying the derived ratios with the suitable weights stored in system memory.

Still one more object of the present invention is to provide a system capable of automatic detection of authenticity by incorporating a microcontroller and a firmware to logically derive a figure of merit to define authenticity or fakeness from comparison of weighted ratios derived from the measured data for the document under inspection with the corresponding reference values.

Still another object of the present invention is to provide a system capable of automatic detection of authenticity with a provision of operator selectable sensitivity level.

Still another object of the present invention is to provide a system capable of automatic detection of authenticity with a provision of entering document specific code so that corresponding reference information is used to compare with measured and weighted ratios to objectively assess the authenticity.

Yet one more object of the present invention is to provide a system capable of automatic detection with provision for acquiring reflected/fluoresced information from the document under verification and also transmitted information through the document under inspection in near infra red region of the spectrum.

Still one more object of the present invention is to provide a system capable of automatic detection of authenticity by incorporating self calibrating mechanism to off set temporal and diurnal variations of electro-optic subsystem out put caused by circuit noise and light source fluctuations.

Still another object of the present invention is to provide automatic detection system insensitive to short term thermal drifts and the others due to ageing and replacement of UV visible light source, accumulation of dust and variation due to power.

Yet another object of the present invention is to provide a system with detection capability for a plurality of bank drafts, security bonds and other bank instruments and security documents.

Yet one more object of the invention is providing a system for not identifying a mutilated/damaged currency notes as fake.

Still one more object of the invention is to provide a system for not mis-identifying genuine paper and polymer based currency notes, due to accidentally (e.g. washing) acquiring similar transmission or reflective/fluorescent properties of a fake note.

Still another object of the present invention is to use of standard UV fluorescent tube light, emitting 350 nm to red end of electromagnetic spectrum of size varying from 150 mm to 350 mm (tube length) and of any wattage varying from 7 W to 15 W.

Still another object of the present invention is to use of another light source, emitting near infra red part of electromagnetic spectrum.

Another object of the present invention is to provide a system with adequate distance between the said light sources and the document under inspection such that the entire document illuminated brightly and evenly during both transmission and reflectance/fluorescence measurements.

One more object of the present invention is to provide a system with adequate distance between the said photodetectors and the document under inspection such that transmitted or reflected/fluoresced energy from a very large area of the document under authentication reaches each photodetector.

Another object of the present invention is to provide provision of inclusion of at least three optical band pass filters of desired spectral transmitting characteristics in front of the photodetectors both for transmission and reflection measurements.

Still another object of the present invention is to provide provision of inclusion of optical band pass filters used in transmission measurement having different spectral transmitting characteristics from those used for reflection measurement.

Still one more objective of the present invention is provide a system incorporating a pair one surface ground optical glass plates for holding the document under verification in place in a wrinkle free condition.

Still one more objective of the present invention wherein surface facing the photodetectors meant for both transmission and reflection of each glass plate is ground to facilitate spatial integration.

Still another object of the present invention is to provide a system capable of indicating the authenticity of a security document by making a LED marked "PASS" glow in case the document is genuine.

Yet another object of the present invention is to provide a system capable of indicating the authenticity of a security document by making a LED marked "FAKE" glow and triggering an audio alarm in case the document is a counterfeit.

SUMMARY OF THE INVENTION

A currency genuineness detection system using plurality of opto-electronic sensors with both transmission and reflective (including fluorescence) properties of security documents is developed. Both detection sensing strategies utilize integrated response of the wide optical band sensed under UV visible along with optional near infra red light illumination. A security document is examined under static condition. A window signal signature is thus possible from photodetectors responses for various kinds of documents of different denominations, kinds and country of origin. A programmable technique for checking the genuineness of a security document is possible by feeding a unique code of the currency under examination.

BRIEF DESCRIPTION OF THE ACCOMPANYING DRAWINGS

FIG. 1: Design showing both transmission and reflection properties sensing of authenticity of a security document.

FIG. 2: Overall block diagram of the system.

FIG. 3: Block diagram of the electronic sub-system

FIG. 4: Ray diagram (Schematic)

FIG. 5: Flow-chart for authentication

DETAILED DESCRIPTION OF THE INVENTION

Security documents of various kinds like, currency notes, bank instruments, passport, visa, security bonds etc. can be authenticated by the present invention. However, for brevity, the words currency note are used in following description and these words by no means restrict the applicability of the system.

FIGS. 1 and 2 show the front view and block diagram of the invention respectively. All the walls, the ceiling and floors are so constructed that no stray light reaches any of the photodetectors from outside. The three LEDs 1*a*, 1*b* & 1*c* are fitted to the front panel to indicate the status of inspection. In no note condition, system diagnostics is continuously performed and a yellow LED marked "Ready" glows indicating proper functioning. The insertion of a currency note makes either of LEDs marked "Pass" or "Fake" glow depending upon authenticity. A digital display 2 shows the programmable unique code provided to each type (including the nature and country of origin) whose reference values are stored as firmware. The code is appropriately chosen at the time of examination of the currency by the apparatus. A UV fluorescent tube light 3*a* mounted such a height that it fully illuminates a suitably placed currency note. An additional compact near infra red source 3*b* can be mounted by the side of the fluorescent tube. There are two Sensor Heads 4*a* and 4*b* for reflection and transmission sensing respectively. Each sensor head consists of at least three photodetector-band pass filter combination (5*b* as shown in the inset of FIG. 2) with built-in amplification with a lower cut-off wavelength of 350 nm (for example UDT455HS), and they are closely spaced together. Sensor heads 4*a* and 4*b* are so positioned that each receives light from at least half the area, in case the document is of large size other wise from the total surface area of the document under authentication 6, one above the note for reflection sensing and the other one below it for transmission sensing. The band pass characteristics of each filter are different but together they cover UV visible along with optional near infra red spectrum. These photodetectors generate electrical signals corresponding to the received light energy. The filters used in sensor head 4*a* may or may not be similar to those used in sensor head 4*b*. During verification, the document 6 is inserted in a specified manner between two glass plates, 7*a* and 7*b*. One side of each glass plate 7*a* and 7*b* is a ground surface. Glass plates 7*a* and 7*b* are fixed between sensor heads 4*a* and 4*b* such that the their ground surfaces facing sensor heads 4*a* and 4*b* and the note 6 is evenly illuminated all over, at the same time sensor heads 4*a* and 4*b* receive reflected/transmitted light from at least half of the note 6. The currency note is held in place in the gap 10, between glass plates 7*a* and 7*b*. The gap 10 is so adjusted that the document can be easily and smoothly inserted at the same time it tends to flatten out the gross unevenness due to folding etc. Proper adjustment of the gap 10 keeps the surface of a note 6 flat and also blocks stray light from creeping on to sensor heads 4*a* and 4*b*. The UV source 3, sensors 4*a* and 4*b*, processing electronics 8, glass plates 7*a* and 7*b* and other associated electronic circuitry 8, are enclosed in an enclosed box 9, having a ceiling, floor, two side walls and a front panel. A narrow slit 10, in the front panel allows a currency note to be inserted between 7*a* and 7*b*. Width and depth of the box is such that it can accommodate different kinds of documents from different countries. To cut-down stray light due to internal reflections, both the edges of glass plate 7*a* are painted dull black through the depth direction such that about 84 mm of the central part remains clear for transmission and reflection measurements. Switch 11 puts on/off the power supply from mains.

FIG. 3 shows the block diagram of the electronic subsystem. For brevity only three photodetectors in a single sensor head is shown. The number is only indicative and not restrictive. As mentioned earlier, sensor heads 4*a* and 4*b* provide three signals each, thus generating six analog signals. A multiplexer 12, and A/D converter 13 combination lets a microcontroller 14 sample all these signals acquired for further processing. These are normalized for reliable authentication as explained later. Reference data generated from various currency notes data are stored in the memory unit 15 as firmware for authentication. In addition, country and currency specific weights also form a part of another firmware 16. The user has a provision to programme the sensitivity and the desired currency code through keys 17 (not shown). In operation audio visual alarms 18 provide the result of authentication.

The following is a mathematical analysis of the working of the present invention. FIG. 4 shows the ray diagram. When a currency note is placed under a broad source of light every point on it receives incidence radiation from different source points at different angles. Any point on the active area of a sensor head 4*b*, placed at height z would receive transmitted light flux dF corresponding to a waveband of dλ from an elementary area dx.dy 19 of the security document 6, given by the following equation:

$$dF\alpha\{t_{\lambda,x,y}b(\lambda,x,y)/(x^2+y^2+z^2)\}.d\lambda.dx.dy \quad (1)$$

And 4*b* would generate an electrical signal $dS_\lambda$ given by:

$$dS_\lambda=k(\lambda).\{t_{\lambda,x,y}b(\lambda,x,y)/(x^2+y^2+z^2)\}.d\lambda.dx.dy \quad (2)$$

where, k(λ): A wavelength dependent constant of proportionality indicating energy conversion efficiency of the photodetector and filter combine $t_{\lambda,x,y}$: Transmittance corresponding to wavelength λ at P(x, y)

b(λ,x,y): Incident energy—depends upon the source type and its location (x, y): coordinates of the centre point P of the elementary area taking the foot of the normal drawn from the detector surface to the plane of security document as the origin. The electrical signal generated by a point on the detector surface corresponding to waveband of $(\lambda_1-\lambda_2)$ is given by, $$S=\iiint k(\lambda).\{t_{\lambda,x,y}b(\lambda,x,y)/(x^2+y^2+z^2)\}.d\lambda.dx.dy \quad (3)$$

The inner integration is performed over the waveband while two outer integrals correspond to the area viewed by the photodetector when a security document is placed inside the built in dark chamber of the present invention. Equation (1) gives signal generated by a point on the photodetector. Actual signal measured would be sum the signals of all points on the active area of the photodetector. It would enhance the signal level only, for brevity, not shown in the equation.

The non-uniform illumination term b(λ,x,y) remains reasonably high within the limits of the integration, if the angles subtended by the extreme points of the source are not large at any point of the part of the security document under inspection. In the present invention this achieved by not keeping the broad source close to the security document. Also, $\lambda_{\lambda,x,y}$ is the average value of transmittance over the waveband and is also a function of local conditions like soiling/mutilation and the type and amount of printed matter. Placed at a distance of 50 mm or more, the 4*b* would receive sufficient light flux from at least half the area of a document under authentication 6. The process of spatial integration reduces the effect of aberration, due to local perturbations, to an insignificant level. Consequently, the measured signal S is truly indicative of the average transmittance of the document material corresponding to the selected waveband.

In the present invention 5*b*, coupled with a specific optical wavelength filters, simultaneously and independently measure spectral transmittance in the three selected optical wave bands. Signals $S_1$, $S_2$, $S_2$ from each photodetector are given by, $$S_1=\iiint k_1(\lambda).\{t_{\lambda,1,x,y}b(\lambda,x,y)/(x^2{}'y^2+z^2)\}.d\lambda.dx.dy \quad (4a)$$

$$S_2=\iiint k_2(\lambda).\{t_{\lambda,2,x,y}b(\lambda,x,y)/(x^2+y^2+z^2)\}.d\lambda.dx.dy \quad (4b)$$

$$S_3=\iiint k_3(\lambda).\{t_{\lambda,3,x,y}b(\lambda,x,y)/(x^2+y^2+z^2)\}.d\lambda.dx.dy \quad (4b)$$

Where, $t_{\lambda,1,x,y}$, $t_{\lambda,2,x,y}$, $t_{\lambda,3,x,y}$ are the average transmittance values corresponding to the three optical filters 5*b*.

The unit-less voltage ratio sets $[S_1/(S_1+S_2+S_3)$, $S_2/(S_1+S_2+S_3)$, $S_3(S_1+S_2+S_3)]$, $[S_1/S_2$, $S_1/S_3$, $S_2/S_3]$, and many similar algebraic variants (using viz. squares of various voltages) form feature sets that characterize the document material in terms of its transmitting properties in three wavebands. Similar set of data, $[S^r_1/(S^r_1+S^r_2+S^r_3)$, $S^r_2/(S^r_1+S^r_2+S^r_3)$, $S^r_3/(S^r_1+S^r_2+S^r_3)]$ or $[S^r_1/S^r_2$, $S^r_1/S^r_3$, $S^r_2/S^r_3]$ corresponding to the reflected/flouresced energy characterize the document material in terms of its spectral reflectance properties. The choice of such sets is dependent upon the class of documents under examination. For currency, the former of the above explained sets is preferred. The normalized spectral transmitting and reflecting properties would uniquely define the document of any nature and kind from any country and efficiently distinguish between the genuine and fake ones. For experiments conducted chosen wavebands were UV blue, yellow and red and corresponding ratios (percentages) of the individual to total response were computed. FIG. 5 shows the system software flow-chart where in three photodetectors for reflection and three photodetectors for transmission measurements are shown numbers are only indicative and not restrictive. Omitting the usual diagnostics at power-on and a user selection of the currency under examination, a stage is reached where the system is in operation and examining the currency of interest with appropriate code of the document.

With this information, it is in detection mode. It can detect not only genuineness but add to self-diagnosis linked with various sensors and source modules along with associated circuitry. As a routine, it senses the presence of the document 6 and the sensor signals in the overall working range. Only if the normal behaviour is observed by the sensors 4*a* and 4*b* and the associated circuitry, the routine progresses further to acquire data for processing. In such condition, the microcontroller 14 instructs the multiplexer 15 for scanning six inputs which are converted into digital form by the A/D Converter 13. The voltage readings are normalized by ratios suggested later in Equation 4a, b and c to form various percentages. Various sets (=n) can be formed depending upon the choice of features to be used. In this manner, since there are three bands and two sensor heads 4*a*&*b* (m=6), we get a maximum of 6n normalized features (Xi in percentage form) to be used for detection. Our data in various tables given later shows only a single normalization (n=1) with various colour band readings normalized to the total of the six (three from transmission and three from reflection) readings. The next step provides various outputs (Oi=1 or 0) for each of these feature values using Reference Database 15. The results so obtained are weighted as per the Weight Matrix 16 suited for a series of documents to generate a score value to provide minimum errors of detection. Finally, a user selectable Sensitivity level using keypad 17 is provided for acceptability of the detection. Using these levels, a strict or loose score is used to detect the genuineness and accordingly audio-visual alarm 18 is set for "Pass" or "Fake" situation. In either case, the loop continues to sense the presence of note and accordingly generate the genuineness result.

Accordingly, the present invention provides a system for automatic sensing authenticity of security documents like paper and polymer based currency notes, various bank instruments etc., the said system comprising a UV visible source along with optional near infra red source, an optional compact near infra red source; a closed chamber for automatic detection of authenticity, a pair of one surface ground parallel glass plates for suitably holding the document during verification process; multiple broad band pass optical filters and photodetectors; opto-electronic signal acquisition, conditioning and processing circuitry; a microcontroller and a firmware to logically indicate whether the document under verification is genuine or fake based on normalized weighted acquired reflection and transmission data and stored reference; human interface with the microcontroller and system memory to enter desired sensitivity level, document code, reference data, weight matrix etc.; LED displays and audio alarm.

In another embodiment of the present invention, an objective and simultaneous measurement of reflecting and transmitting properties of a security document is possible in a closed opto-electronic sensing chamber by sliding the document to be authenticated gently to generate quantitative signal level for audio-visual alarm/display indicating whether the document is genuine or fake.

In another embodiment of the present invention, broad band multi-spectral reflectance and transmittance signatures are used to uniquely identify, in terms of authenticity, the document under verification.

In another embodiment of the present invention, the system can be used for automatic detection of authenticity by characterizing a security document in terms of spectral transmission and reflection/fluorescence properties in at least three wavebands covering UV visible and near infra red spectrum.

In another embodiment of the present invention, the system can be used for automatic detection of authenticity by comparing normalized and weighted spectral signatures in the selected wave bands to the corresponding reference signatures stored in the system memory.

In another embodiment of the present invention, the wave band filters used in transmission measurements may or may not be same as those used fro reflection/fluorescence measurements.

In still one more embodiment of the present invention, spectral signature corresponding to each optical band is measured by spatially integrating the reflected/fluoresced light coming from a large surface area of the document under verification at the same time performing integration over spectral band width of corresponding filter.

In yet another embodiment of the present invention, spectral range of reflectance and transmittance measurements cover UV-visible-near infrared region of electromagnetic spectrum.

Still one more embodiment of the present invention, single document can be handled at a time, it need not be stacked with multiple documents of the same or different kind In yet one another embodiment of the present invention, the document is gently slid in the system where two sets of photodetectors with different waveband filters, one set above and the other set below the document under verification sense the transmitting and reflecting properties under UV visible-near infra red illumination.

In one more embodiment of the present invention, the document is kept stationary during authentication process.

In still another embodiment of the present invention, the light sources are so positioned that entire surface area of the document is brightly and uniformly illuminated.

In still another embodiment of the present invention, reflected/fluoresced light from a very large area of the document surface is collected simultaneously keeping the document stationary.

In still another embodiment of the present invention, transmitted light through a very large area of the document surface is collected simultaneously keeping the document stationary.

In still one more embodiment of the present invention, spectral signature corresponding to each optical band is measured by spatially integrating the reflected/fluoresced light coming from a large surface area of the document under verification at the same time performing integration over the spectral band width of the corresponding filter.

In still one more embodiment of the present invention, spectral signature corresponding to each optical band is measured by spatially integrating the transmitted light coming through a large surface area of the document under verification at the same time performing integration over the spectral band width of the corresponding filter.

In yet another embodiment of the present invention, any kind of security document can be fed to the system for verification in any order or sequence.

In still one more embodiment of the present invention, the system does need the scanning or transportation during measurement process which is not desirable for, in certain applications where multiple documents are not required to be verified, e.g. bank draft, bank cheque and other bank security instruments.

In another embodiment of the present invention, based on the reflected and transmitted data collected from a security document, it is possible to set multiple quantitative signal levels, corresponding to transmission data and reflection data to defining authenticity depending upon the country of origin, type and kind of document and appropriate weighted logic can be employed to judge the authenticity.

In yet another embodiment of the present invention, the photodetectors used for automatic sensing of transmission and reflection properties are so located that each photodetector receives transmitted or reflected light from at least about half the area of the document under verification.

In still another embodiment of the present invention, the system incorporates a microcontroller and necessary signal acquiring, conditioning, processing, display and audio alarm electronics circuitry.

In another embodiment of the present invention, measured reflected/fluoresced from a genuine document is suitable normalized to form a set of ratios and stored in the system memory.

In another embodiment of the present invention, suitably normalized measured reflected/fluoresced from a genuine document stored in the system memory is tagged by a document specific code.

In another embodiment of the present invention, measured transmitted through a genuine document is suitable normalized to form a set of ratios and stored in the system memory.

In another embodiment of the present invention, suitably normalized measured transmitted from a genuine document stored in the system memory is tagged by a document specific code, the codes used for reflection and transmission data being identical for the identical document.

In still one more embodiment of the present invention, the document specific codes and corresponding reference values can be entered in system memory to create or upgrade reference data base either at the factory level or user's premises.

In yet one more embodiment of the present invention, a weight matrix is stored in system memory to generate suitably weighted normalized reflection/fluorescence and transmitted data both for stored reference values and values acquired from the document under verification.

In still one more embodiment of the present invention, the weight matrix can be entered in system memory to create or upgrade reference data base either at the factory level or user's premises.

In yet another embodiment of the present invention, user can enter the desired sensitivity depending upon the physical conditions, aging and value of the document under verification.

In another embodiment of the present invention, a firmware derives a single figure of merit based on the chosen sensitivity, the stored reference, measured data and assigned weights following a logical sequence.

In yet one more embodiment of the present invention, the derived figure of merit is used to take decision regarding the authenticity of the document.

In yet one more embodiment of the present invention, LEDs, one marked "PASS" and the other marked "FAKE" are fitted to display decision regarding authenticity.

In another embodiment of the present invention, depending upon whether the document under verification is genuine or counterfeit, the respective LED glows.

In still one more embodiment of the present invention, an audio alarm is triggered when the security document under verification is fake.

In yet another embodiment of the present invention, the photodetectors used for automatic sensing of transmission and reflection properties of a document have the performance characteristics covering a spectral band of 350 nm to 700 nm and optionally 350 nm to 1500 nm.

In still one more embodiment of the present invention, is to provide a system capable self calibrating mechanism to off set temporal and diurnal variations of electro-optic subsystem out put caused by circuit noise and light source fluctuations.

Still another object of the present invention is to provide automatic detection system electronically made insensitive to short term thermal drifts and the others due to ageing and replacement of UV visible light source along with optional near infra red, accumulation of dust and variation due to power.

In one more embodiment of the present invention, more than one types of document can be tested for authenticity.

In one more embodiment of the present invention, more than one country's documents can be tested for authenticity.

Having given the principle of the currency sensing automatically, we now provide the schematic design of the system which allows genuine currency paper's properties to be used for testing its authenticity.

The special characteristics of the instrument and where it can be used are as follows:

A system useful for sensing currency detection automatically.

A system claimed herein wherein two sets of optoelectronic sensors are used and integrated response under UV light is used.

A system useful for testing multiple countries' currency in a programmed manner based on quantitative measurement of reflective and transmission properties for automatic detection.

A system allowing standard photo detectors to be used.

The invention is described in detail in the examples given below which are provided by way of illustration and therefore should not be considered to limit the present invention in any manner. In all the examples cited below, a set of three standards filters (Blue, Yellow and Red) KL1500 from Schott have been used. The raw signal values S1, S2, and S3 were normalized by dividing each of them by the sum factor (S1+S2+S3), converted into a percentage readings. Hence only one normalized set (n=1) was used. The same approach is applied for both transmission and reflection sensing. Also the currency specific weight matrix 16 had no special weighting as all weights had equal values.

Example 1

For experimental testing of the proposed apparatus, a fake Indian currency note of denomination 'A' (Series-2) was checked. Table I shows, that the yellow and red band reflection readings of the fake note were within the acceptable range, showing the note as genuine. However, all transmission and the blue band reflection readings of the fake note clearly identified it to be fake.

Example 2

For experimental testing of the proposed apparatus, a fake Indian currency note of denomination 'B' (Series-2) was checked. Table II shows that the blue and yellow band reflection readings were out of the permissible range, while the red band indicated genuineness. The experiment shows that confirmation of a majority rule is essential for currency verification particularly for cleverly counterfeit notes incorporating all UV visible security features.

Example 3

For experimental testing of the proposed apparatus, a fake Indian currency note of denomination value 'A" Series-1 (old series, which did not contain any UV fluorescent feature but still in circulation) was checked. All the reflection data failed to identify it as a fake. However, all transmission data for all the bands were well beyond the permissible range. It concludes that properly weighted all reflection and transmission data is imperative to verify authenticity of a currency note.

Example 4

For experimental testing of apparatus, a number of genuine Indian currency notes of denomination 'A', 'B' and 'C' under moderate usage were verified. The results show that the "majority rule of acceptance" using the reference data given in Table I-III, identified all the notes as genuine.

Example 5

For experimental testing of apparatus, a moderately used genuine Indian currency note of denomination 'A' Series-2, was subjected to application of a commercial detergent. The same note was inspected for its authenticity. The measured blue, red and yellow wave band reflection readings were 14.7%, 41.035% and 44.265%. From Table I, it can be seen that the blue band readings was beyond the permissible range while the other two were within the permissible range. It shows that "majority rule of acceptance" of the apparatus identifies a genuine currency note as genuine even though it had accidentally acquired UV fluorescent properties of a fake currency note.

Example 6

For experimental testing of apparatus, five soiled but genuine Indian currency notes of denomination 'A' were tested for their responses in three wave bands. The notes were then thoroughly cleaned by laboratory grade alcohol. The wave band responses of the cleaned notes were measured with those of the unsoiled conditions. It was found that the readings did not vary much. This shows that the instrument is insensitive to the physical conditions of the note.

Example 7

The invented technique can be extended to the polymer based currency without any need to modify the apparatus. For experimental testing of the proposed apparatus, polymer based currency notes of three countries were used, taking two currency notes of same denomination from each country. For an elaborate judgement, both sides of both notes were used for checking the suitability of the apparatus in different conditions. Table IV shows all (yellow, red and blue) bands of both transmission and reflection readings. In different rows, the readings are very close to indicate that different notes provide a repeatable evidence for checking genuineness. Also, transmission characteristics in the three bands show sufficient evidence with close similarity within same currency and detectable dissimilarity among different currencies. However, for precise authentication, reflection readings are required to be complimented by the transmission readings.

TABLE I

| Denomination 'A' Notes | | | | |
|---|---|---|---|---|
| Currency Description | | % of Blue | % of Red | % of Yellow |
| Transmission | | | | |
| Den. 'A' Series-1, New | AVG | 9.51 | 46.67 | 43.84 |
| | RANGE | 9.08-9.82 | 45.91-47.15 | 43.48-45.02 |
| Den. 'A' Series-1, Soiled | AVG | 10.19 | 43.57 | 46.25 |
| | RANGE | 8.951-10.97 | 42.72-44.51 | 45.32-48.20 |
| Den. 'A' Series-2, New | AVG | 10.24 | 43.77 | 46.01 |
| | RANGE | 9.841-10.925 | 43.70-44.49 | 45.35-45.89 |
| Den. 'A' Series-2, Fake | | 11.62 | 39.60 | 48.79 |
| Reflection | | | | |
| Den. 'A' Series-1, Normal | AVG | 13.08 | 44.05 | 42.88 |
| | RANGE | 11.90-14.04 | 40.84-47.10 | 40.37-47.24 |
| Den. 'A' Series-2, Soiled | AVG | 13.01 | 41.41 | 45.58 |
| | RANGE | 11.98-13.98 | 39.63-43.61 | 43.75-47.81 |
| Den. 'A' Series-2, New | AVG | 12.30 | 42.30 | 45.41 |
| | RANGE | 12.16-12.40 | 40.273-43.810 | 44.02-47.32 |
| Den. 'A' Series-2, Fake | | 14.69 | 40.80 | 44.53 |

"Series" denotes print Series and New/Normal/Soiled denotes physical conditions

Unless specified as "Fake", the currency noe used is genuine

TABLE II

| Denomination 'B' Notes | | | | |
|---|---|---|---|---|
| Currency Description | | % of Blue | % of Red | % of Yellow |
| Transmission | | | | |
| Den. 'B' Series-1, New | AVG | 9.09 | 44.97 | 45.95 |
| | RANGE | 8.821-9.428 | 44.714-45.629 | 44.941-45.607 |
| Den. 'B' Series-2, Normal | AVG | 10.17 | 44.34 | 45.50 |
| | RANGE | 9.62-10.38 | 44.03-44.60 | 45.24-45.77 |
| Den. 'B' Series-2, Soiled | AVG | 10.03 | 43.69 | 46.30 |
| | RANGE | 9.79-10.36 | 42.73-44.18 | 45.91-46.90 |
| Den. 'B' Series-2, Fake | | 11.26 | 46.61 | 42.15 |
| Reflection | | | | |
| Den. 'B' Series-1, New | AVG | 14.93 | 42.19 | 42.90 |
| | RANGE | 14.24-15.60 | 41.07-43.27 | 41.13-43.90 |
| Den. 'B' Series-2, Normal | AVG | 13.74 | 41.43 | 44.85 |
| | RANGE | 13.326-14.40 | 40.04-43.46 | 42.95-47.96 |
| Den. 'B' Series-2, Soiled | AVG | 12.69 | 41.32 | 46.00 |
| | RANGE | 12.26-12.94 | 40.42-41.85 | 45.54-46.65 |
| Den. 'B' Series-2, Fake | | 14.20 | 40.60 | 45.21 |

TABLE III

| Denomination 'C' Notes | | | | |
|---|---|---|---|---|
| Currency Description | | % of Blue | % of Red | % of Yellow |
| Transmission | | | | |
| Den. C Series-1 New | AVG | 10.07 | 44.74 | 45.20 |
| | RANGE | 9.26-10.447 | 44.40-45.65 | 44.95-45.68 |
| Reflection | | | | |
| Den. C Series-1, New | AVG | 12.28 | 42.49 | 45.24 |
| | RANGE | 11.04-13.34 | 39.92-44.72 | 42.84-45.98 |

TABLE IV

| International Currency Notes (Polymer) | | | | |
|---|---|---|---|---|
| Currency Description | | % of Blue | % of Red | % of Yellow |
| Transmission | | | | |
| Country 1 | Side 1 (note 1, 2) | 8.462, 8.661 | 46.15, 46.46 | 45.38, 44.88 |
| | Side 2 (note 1, 2) | 8.594, 8.661 | 46.09, 45.67 | 45.31, 45.67 |
| Country 2 | Side 1 (note 1, 2) | 8.271, 8.955 | 45.86, 45.52 | 45.86, 45.52 |
| | Side 2 (note 1, 2) | 9.091, 8.943 | 45.45, 45.53 | 45.45, 45.53 |
| Country 3 | Side 1 (note 1, 2) | 9.901, 10 | 44.55, 46 | 45.54, 44 |
| | Side 2 (note 1, 2) | 8.871, 8.8 | 45.16, 46.4 | 45.97, 44.8 |
| Reflection | | | | |
| Country 1 | Side 1 (note 1, 2) | 14.55, 14.89 | 40.39, 40.03 | 45.06, 45.08 |
| | Side 2 (note 1, 2) | 14.78, 14.78 | 39.97, 40.61 | 45.25, 44.61 |
| Country 2 | Side 1 (note 1, 2) | 15.69, 15.71 | 41.11, 40.39 | 43.19, 43.9 |
| | Side 2 (note 1, 2) | 15.83, 15.67 | 41.94, 41.42 | 42.22, 42.92 |
| Country 3 | Side 1 (note 1, 2) | 15.83, 15.33 | 42.08, 42.54 | 42.08, 42.13 |
| | Side 2 (note 1, 2) | 16.49, 15.87 | 40.8, 41.19 | 42.71, 42.94 |

ADVANTAGES OF THE INVENTION

A system incorporates more than one technique of verifying the authenticity of a security document, namely technique based on transmitting property measurement and technique based on reflecting property measurement.

A system based on the spatially integrated response of the photodetectors for at least three optical wave bands covering UV visible along with optional near infra red spectrum both in transmission and reflection.

A system capable of completely characterizing a currency note in terms of its spectral transmission and reflection properties.

A system that can be used to authenticate both paper and polymer based security documents.

A system where each currency is judged by reference signals pre-stored for its category with a unique code in terms of country of origin, denomination and series.

A system in which unique set of weights are pre-assigned to achieve a minimum false alarm rate for independently for each currency.

A system in which, based on measured transmission and reflection data, reference levels photoelectric signal indicating authenticity can be set independently for transmission and reflection corresponding to various types of security documents from different countries.

The system provides the adjustment for two (lower and upper) signal values of both transmission and reflection photodetectors, by suitable use of flash memory or other suitable firmware, the instrument can be factory or field set for any currency or document.

A system in which, based on the measured signals corresponding to transmission and reflection at least three wavebands covering UV visible along with optional near infra red spectrum, a single merit function can be defined to indicate authenticity.

A system capable of distinguishing a genuine currency note, acquiring UV fluorescent properties similar to a fake one due to accidental application of detergent or otherwise, from a fake one.

A system capable of authenticating a soiled or mutilated genuine currency note eliminating the effects of local perturbations using spatial integration technique.

A system eliminates the use of note transport mechanism or any other moving parts to scan a zone of a currency note by using spatial integration technique over at least half the area of the currency note both in transmission and reflection.

A system with the flexibility in the choice of optical band pass filters both for transmission and reflection, filters used for transmission measurement may or may not be identical to those used in reflection measurement to take care of future currency notes with new features added.

The device allows standard components of illumination and sensing without further sophisticated filters, which sense in a narrow band and require more signal amplification.

The device is suitable for various denominations of currencies and can be programmed for various foreign currencies with unique properties for each currency and denomination.

We claim:

1. A system for automatic discrimination of the authenticity of currency notes, security instruments, security documents and similar documents, said system comprising:

a) a suitably located UV visible radiation emitting fluorescent tube light or equivalent source;

b) two sets of sensor heads, each sensor head incorporating plurality of photodetectors;

c) a signal conditioning hardware and software comprising, a micro-controller to process and normalise sensors data, store or compare online the measured data with the reference data independently for each security document; weight the comparative results to detect the genuineness;

d) displays; audio-visual alarm; appropriate slot for insertion of the document under inspection, e) all the above mentioned components/devices/modules being enclosed in box such that the system performance remains immune to the influence of ambient light; and wherein, the said system authenticates a currency notes, security instruments, security documents and similar documents by acquiring transmitted and reflected/fluoresced data, integrated in space and time domain in at least three broad spectral wave bands covering UV visible and optionally NIR part of spectrum, each for transmission and reflection/fluorescence, collected from an area of the document comprising more than half of an entire document surface area, which is kept in a stationary condition during authentication process by illuminating the document using the light from a single broad band source with a provision to use an additional near infra red (NIR) source to provide transmitted and reflected/fluorescence data in NIR region together with transmitted and reflected data in UV visible and near infra red region, and by using the measured transmitted signals in to define a set of ratios and by using the measured reflected/fluoresced signals to define another set of ratios and by comparing these ratios with the corresponding stored reference values to judge authenticity of the document under verification.

2. A system as claimed in claim 1, wherein the UV visible source is provided with an optional compact near infra red (NIR) source such that either the UV visible source or both the sources can be switched on simultaneously.

3. A system as claimed in claim 1, wherein said each photodetector is provided with a broad band pass optical filter, covering different wave bands but together all the filter-photodetector combination covering entire UV-visible-near IR spectrum.

4. A system as claimed in claim 1, wherein the each sensor head set is so positioned that one set of sensor heads receives and measures the reflected/fluoresced energy from about half the area of first types of security documents like currency notes, security instruments, security documents and similar documents and from the total area of second types of security documents in at least three wave bands while the other receives and measures the transmitted energy from the other of half of security documents in case of first types of documents and from the entire area of second types of documents in at least three wave bands.

5. A system as claimed in claim 1, wherein the security document for authentication can be selected from the group comprising of paper based currency notes, polymer based currency notes, security bonds of different types, bank instruments and checks.

6. A system as claimed in claim 1, where in the system comprises of a broad band UV visible tube light source, an optional compact near infra red (NIR) source, two sensor heads each containing at least three closely spaced photodetectors and optical filter combination, a pair of ground glass plates to hold the document under inspection in position, signal processing electronics, electronic memory to store data, electronic devices to implement logical decisions based on the comparison of data acquired and stored data to indicate authentication or counterfeit and necessary software/firmware enclosed in a closed box to cut off ambient light and LEDs and an audio alarm speaker for audio visual display.

7. A system as claimed in claim 1, wherein the system is made insensitivity to short-term thermal drifts, ageing effect and accumulation of dust by incorporating a single source and multiple photodetectors to normalize responses.

8. A system as claimed in claim 1, wherein multiple photodetectors are used and an optical wave band filter is combined with each photodetector so that each photodetector-filter combination measures energy corresponding to a preferred wave band.

9. A system as claimed in claim 1, wherein at least three different wave band filters are used for reflection measurements such that together these filters cover UV visible and optionally near infra red spectrum.

10. A system as claimed in claim 1, wherein at least three different wave band filters are used for transmission measurements such that together these filters cover UV and optionally NIR spectrum.

11. A system as claimed in claim 1, wherein the optical wave band filters used for reflection measurements may or may not be same as those used for transmission measurements.

12. A system as claimed in claim 1, wherein currency notes, security instruments, security documents and similar documents are placed manually in a narrow spacing provided by two parallel glass plates.

13. A system as claimed in claim 1, wherein a pair of glass plates are incorporated with an upper surface of the upper glass plate and a lower surface of the lower glass plate being ground.

14. A system as claimed in claim 1, wherein a pair of ground glass plates are used to achieve better spatial integration of light, to minimize the contribution of local area perturbation in the security document, to eliminate back spectral reflection from the ground glass plates and to remove wrinkles of the document during authentication.

15. A system as claimed in claim 1, wherein the ground glass plates are fixed at such location that the sandwiched document under inspection is evenly illuminated and all the photodetector-filter combinations collect reflected/transmitted light from about half the area of the document under inspection, if the document of first size like a currency note, security instrument, security document and similar documents, and otherwise from the total surface when the document is of a second size smaller than the first size.

16. A system as claimed in claim 1, wherein in a preferred manner the each of the reflection measuring closely spaced photodetector-filter combination in sensor head (SH) receives light flux from the area of about one half side if the document is of a first size e.g. a currency note, security instrument, security document and similar documents, or from the entire surface if the document is of a second size smaller than the first size, and each of the transmission measuring closely spaced photodetector-filter combination in sensor head (SH) sees either the other half side or full side depending upon the document size, by placing the document in a fixed suggested orientation.

17. A system as claimed in claim 1, wherein the sensor head for reflection measurement is kept at least 125 mm from the document under verification so that sufficient light from the about half or total surface area of the document under verification reaches the photodetector-filter combination so that each photodetector measures spatially and temporally integrated reflected light flux in the preferred optical wave band by performing the following integration in space and time domain and deriving electrical signal corresponding to the optical wave band selected by the photo detector-filter combination:

$$S=\iiint k(\lambda).\{r_{\lambda,x,y}b(\lambda,x,y)/(x^2+y^2+z^2)\}d\lambda dxdy$$

spatial integration being taken over the surface area of the document of interest and wave length domain integration being taken over the wave band of interest, and where, $k(\lambda)$: a wavelength dependent constant of proportionality indicating energy conversion efficiency of the photodetector and filter combination $r_{\lambda,x,y}$: reflectance corresponding to wavelength $\lambda$ at x,y $b(\lambda,x,y)$: incident energy—depends upon the source type and its location x,y: coordinates of the centre point of the elementary area taking the foot of the normal drawn from the detector surface to the plane of document under authentication as the origin z: vertical distance.

18. A system as claimed in claim 1, wherein the sensor head for reflection measurement are kept at least 100 mm from the document under verification so that sufficient light from the half the area of the document, depending upon the size of the document, under verification reaches the photodetector-filter combination so that each photodetector-filter combination measures spatially integrated the transmitted light flux in the preferred optical wave band.

19. A system as claimed in claim 1, wherein the light source is placed at a distance of at least 150 mm from the upper surface of the document under verification so that the entire area of the said document is brightly and uniformly illuminated.

20. A system as claimed in claim 1, wherein the sensor head for transmission measurement is kept at least 125 mm from the document under verification so that sufficient light from the half or total surface area, depending upon the size of the document, of the document under verification reaches the photodetector-filter combination so that each photodetector measures spatially and temporally integrated transmitted light flux in the preferred optical wave band by performing the following integration in space and time domain and deriving electrical signal corresponding to the optical wave band selected by the photo detector-filter combination:

$$S=\iiint k(\lambda).\{t_{\lambda,x,y}b(\lambda,x,y)/(x^2+y^2+z^2)\}.d\lambda.dx.dy$$

spatial integration being taken over the surface area of the document of interest and wave length domain integration being taken over the wave band of interest, and where, $k(\lambda)$: A wavelength dependent constant of proportionality indicating energy conversion efficiency of the photodetector and filter combine $t_{\lambda,x,y}$: transmittance corresponding to wavelength $\lambda$ of an elementary area of the document $b(\lambda,x,y)$: incident energy—depends upon the source type and its location (x, y): co-ordinates of the centre point an elementary area taking the foot of the normal drawn from the detector surface to the plane of document under authentication as the origin z: vertical distance.

21. A system as claimed in claim 1, wherein responses of genuine documents of multiple types or country of origin are stored in the system memory.

22. A system as claimed in claim 1, wherein measured electrical signals of transmitted and reflected energy by the photodetector-filter combinations in the chosen optical wavebands are used to form a set of weighted ratios which are compared with the corresponding reference stored values to verify authenticity of a security document following the under mentioned operations sequentially:

f) acquiring signals from all photodetectors without any document present and storing the acquired signals as representing a current "no document" condition;

g) comparing the acquired signals with corresponding stored values of a stored "no document condition";

h) if the acquired signals vary beyond threshold values of corresponding stored values of a stored "no document condition", the system halts and the display 'Ready' is kept in off state indicating component failure;

i) when the acquired signals from the document are within acceptable limit, the 'Ready' display is switched on indicating the may operator may insert the document to be authenticated;

j) after selecting the document the operator manually selects a sensitivity level, keys a document dependant code and inserts the document under authentication, the acquired reflected and transmitted signals corresponding to the preferred optical wave bands are suitably normalised, the code describes the nature and type of document e.g. currency note of denomination 10 from a country and a data base of codes are pre-stored, in case no sensitivity level and/or code are selected the last entered values are taken as default;

k) these normalized values are compared with reference values pre-stored for the particular currency under examination and thus a number of binary results are obtained;

l) the binary results obtained are then multiplied by a set of stored weights pre-assigned corresponding to the currency code;

m) the sum of the weighted values is assigned a score and depending upon the selected sensitivity level the computed score is used to make decision regarding authenticity and the results displayed by making the "PASS" LED glow indicating the document is genuine or making the "FAKE" LED glow simultaneously triggering an audio alarm when the document is counterfeit.

23. A system as claimed in claim 1, wherein a flash memory or other suitable firmware is used to store all reference values and to meet the calibration requirements in a factory or field level.

24. A system as claimed in claim 1, wherein responses from all the photodetector-filter combinations are used to take decision regarding authenticity automatically.

25. A system as claimed in claim 1, wherein the firmware selects the acceptable signal level(s) both for reflection and transmission for the document under inspection for accurate authentication.

26. A system as claimed in claim 1, wherein the automatic detection is achieved based responses of all photodetector-filter combination with or without weight, or wherein priority can be given to transmission measurements or reflection measurements for proper authentication.

27. A system as claimed in claim 1, wherein authentication is obtained by placing the document under authentication between the glass plate through a narrow slit in a dark chamber such that photodetectors do not receives any ambient and stray light from the out side of the dark chamber.

28. A system as claimed in claim 1, wherein the system is useful for detecting genuineness of a plurality of denominations, series and currencies from different countries.

29. A system as claimed in claim 1, wherein the system is useful for detecting genuineness of security documents, which may or may not be having fluorescence emission feature.

30. A system as claimed in claim 1, wherein the system is useful for detecting genuineness of security documents having reflective, fluorescence and transmission properties.

31. A system as claimed in claim 1, wherein unique detection of genuineness is possible by stored references for the pre-specified security documents.

32. A system as claimed in claim 1, wherein multiple levels of decision is possible based on measured spectral transmission and reflection/fluoresce properties of a document by at least six photodetector-filter combinations responses in several different optical wave band.

33. A system as claimed in claim 1, wherein standard photodetectors covering a range of 350 nm-1100 nm are used.

* * * * *